(12) United States Patent
Khmelnitsky et al.

(10) Patent No.: US 8,397,014 B2
(45) Date of Patent: Mar. 12, 2013

(54) MEMORY MAPPING RESTORE AND GARBAGE COLLECTION OPERATIONS

(75) Inventors: Vadim Khmelnitsky, Foster City, CA (US); Nir Jacob Wakrat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 640 days.

(21) Appl. No.: 12/193,613

(22) Filed: Aug. 18, 2008

(65) Prior Publication Data

US 2009/0198947 A1    Aug. 6, 2009

Related U.S. Application Data

(60) Provisional application No. 61/026,095, filed on Feb. 4, 2008.

(51) Int. Cl.
G06F 13/10 (2006.01)

(52) U.S. Cl. ........................................................ 711/103

(58) Field of Classification Search .................. None
See application file for complete search history.

(56) References Cited

U.S. PATENT DOCUMENTS

| | | | |
|---|---|---|---|
| 4,323,987 A | 4/1982 | Holtz et al. | |
| 5,341,330 A * | 8/1994 | Wells et al. | 365/185.33 |
| 5,689,704 A | 11/1997 | Yoshida et al. | |
| 5,950,013 A | 9/1999 | Yoshimura | |
| 6,000,006 A | 12/1999 | Bruce et al. | |
| 6,188,650 B1 | 2/2001 | Hamada et al. | |
| 6,199,076 B1 | 3/2001 | Logan et al. | |
| 6,263,453 B1 | 7/2001 | Anderson | |
| 6,282,624 B1 | 8/2001 | Kimura et al. | |
| 6,388,961 B1 | 5/2002 | Ijichi | |
| 6,427,186 B1 | 7/2002 | Lin et al. | |
| 6,832,293 B1 | 12/2004 | Tagawa et al. | |
| 7,047,353 B2 | 5/2006 | Tsuda et al. | |
| 7,099,239 B2 | 8/2006 | Ogikubo | |
| 7,139,937 B1 | 11/2006 | Kilbourne et al. | |
| 7,234,024 B1 | 6/2007 | Kiselev | |
| 7,412,558 B2 | 8/2008 | Oribe et al. | |
| 2003/0061189 A1 | 3/2003 | Baskins et al. | |
| 2003/0093610 A1 | 5/2003 | Lai et al. | |
| 2004/0186946 A1 | 9/2004 | Lee | |
| 2005/0251617 A1 | 11/2005 | Sinclair et al. | |
| 2005/0262306 A1 | 11/2005 | Nenov et al. | |

(Continued)

FOREIGN PATENT DOCUMENTS

| | | |
|---|---|---|
| EP | 0 522 780 | 1/1993 |
| EP | 1 739 565 | 1/2007 |

(Continued)

OTHER PUBLICATIONS

International Search Report for PCT/US2009/032886.

(Continued)

*Primary Examiner* — Duc Doan

(74) *Attorney, Agent, or Firm* — Meyertons, Hood, Kivlin, Kowert & Goetzel, P.C.

(57) ABSTRACT

Memory mapping techniques for non-volatile memory are disclosed where logical sectors are mapped into physical pages using data structures in volatile and non-volatile memory. In some implementations, a first lookup table in non-volatile memory maps logical sectors directly into physical pages. A second lookup table in volatile memory holds the physical address of the first lookup table in non-volatile memory. In some implementations, a cache in volatile memory holds the physical addresses of the most recently written logical sectors. Also disclosed is a block TOC describing block content which can be used for garbage collection and restore operations.

12 Claims, 12 Drawing Sheets

U.S. PATENT DOCUMENTS

| | | | |
|---|---|---|---|
| 2006/0008256 | A1 | 1/2006 | Khedouri et al. |
| 2007/0011445 | A1* | 1/2007 | Waltermann et al. ............. 713/2 |
| 2007/0016721 | A1* | 1/2007 | Gay ............................. 711/103 |
| 2007/0073764 | A1 | 3/2007 | Oks et al. |
| 2007/0083697 | A1 | 4/2007 | Birrell et al. |
| 2007/0124531 | A1 | 5/2007 | Nishihara |
| 2007/0130441 | A1 | 6/2007 | Wooten |
| 2007/0204128 | A1 | 8/2007 | Lee et al. |
| 2007/0300037 | A1 | 12/2007 | Rogers et al. |
| 2008/0104308 | A1 | 5/2008 | Mo et al. |
| 2008/0177937 | A1* | 7/2008 | Nishihara et al. ............. 711/103 |
| 2008/0189452 | A1 | 8/2008 | Merry, Jr. |
| 2008/0263061 | A1 | 10/2008 | Nath et al. |
| 2008/0263114 | A1 | 10/2008 | Nath et al. |
| 2009/0083478 | A1 | 3/2009 | Kunimatsu et al. |
| 2009/0150641 | A1 | 6/2009 | Flynn et al. |
| 2009/0182962 | A1 | 7/2009 | Khmelnitsky et al. |
| 2009/0198902 | A1 | 8/2009 | Khmelnitsky et al. |
| 2009/0198952 | A1 | 8/2009 | Khmelnitsky et al. |
| 2009/0307409 | A1 | 12/2009 | Rogers et al. |

FOREIGN PATENT DOCUMENTS

| | | |
|---|---|---|
| WO | WO94/20906 | 9/1994 |
| WO | WO 2009/100031 | 8/2009 |

OTHER PUBLICATIONS

Partial Search Report for PCT/US2009/032886.
Post et al., "Index Cache Tree", U.S. Appl. No. 12/509,267, filed Jul. 24, 2009.
Wakrat et al., "Restore Index Page", U.S. Appl. No. 12/509,071, filed Jul. 24, 2009.
Rogers, et al., "Device Memory Management", U.S. Appl. No. 12/134,998, filed Jun. 6, 2008.
International Search Report/Written Opinion in PCT/US2010/42707 mailed Sep. 7, 2010, 8 pages.
International Search Report/Written Opinion in PCT/US2010/42696 mailed Sep. 14, 2010, 8 pages.
Extended European Search Report in EP 10 17 0700 mailed Nov. 29, 2010, 7 pages.
Extended European Search Report in EP 11 18 4176 mailed Jan. 30, 2012, 3 pages.
International Preliminary Report on Patentability in PCT/US2010/042707 mailed Feb. 2, 2012, 7 pages.
International Preliminary Report on Patentability in PCT/US2010/42696 mailed Feb. 2, 2012, 7 pages.

* cited by examiner

MEMORY MAPPING RESTORE AND GARBAGE COLLECTION OPERATIONS

RELATED APPLICATIONS

This application claims the benefit of priority from Provisional Application No. 61/026,095, for "Memory Mapping Techniques," filed Feb. 4, 2008, which provisional application is incorporated by reference herein in its entirety.

This application is related to patent application Ser. No. 12/193,528, for "Memory Mapping Techniques," filed Aug. 18, 2008, and U.S. patent application Ser. No. 12/193,563, for "Memory Mapping Architecture," filed Aug. 18, 2008, each of which is incorporated by reference herein in its entirety.

TECHNICAL FIELD

This subject matter is generally related to memory mapping.

BACKGROUND

Flash memory is a type of electrically erasable programmable read-only memory (EEPROM). Because flash memories are nonvolatile and relatively dense, they are used to store files and other persistent objects in handheld computers, mobile phones, digital cameras, portable music players, and many other devices in which other storage solutions (e.g., magnetic disks) are inappropriate. Unfortunately, flash suffers from two limitations. First, bits can only be cleared by erasing a large block of memory. Second, each block can only sustain a limited number of erasures, after which it can no longer reliably store data. Due to these limitations, complex data structures and algorithms are often required to effectively use flash memories. These algorithms and data structures are used to support efficient not-in-place updates of data, reduce the number of erasures, and level the wear of the blocks in the device.

Flash memories do not support in-place updates or rewrites to physical memory pages unless the block containing the page is erased first. To overcome this deficiency, a hardware and/or software layer is often added to the flash subsystem. This layer, often referred to as a flash translation layer (FTL), along with the flash memory can mimic a secondary storage device by mapping logical sectors to physical memory pages. For many flash based devices, the FTL is implemented as a controller in hardware. The controller can include a processor or microcontroller along with small amounts of volatile memory (e.g., RAM). The controller can be responsible for translating a read/write request from the file system (e.g., a logical sector) into a read/write operation on a specific block of flash, and initiating "garbage collection" (GC) to erase dirty blocks and reclaim free blocks.

Flash devices that require random access or updates (e.g., smart phones) can cause the FTL to execute extra read/write and GC operations. These extra operations can result in unpredictable device behavior and noticeable performance degradation.

SUMMARY

A memory mapping technique for non-volatile memory is disclosed where logical sectors are mapped into physical pages using data structures in volatile and non-volatile memory. In some implementations, a first lookup table in non-volatile memory maps logical sectors directly into physical pages. A second lookup table in volatile memory holds the location of the first lookup table in non-volatile memory. In some implementations, a cache in volatile memory holds the physical addresses of the most recently written logical sectors. Also disclosed is a block TOC describing block content which can be used for garbage collection and restore operations.

The disclosed memory mapping techniques provide several advantages over conventional flash memory block mapping techniques. Some of these advantages include but are not limited to: 1) eliminating the need for block mapping by directly mapping logical sectors to physical pages, 2) eliminating the need for allocating new blocks until all pages in a current block are allocated, 2) eliminating the need for allocating different journaling blocks for different logical areas, and 3) eliminating the need for triggering a GC operation until all pages in the current block are allocated.

DETAILED DESCRIPTION

System Overview

Figure 1:
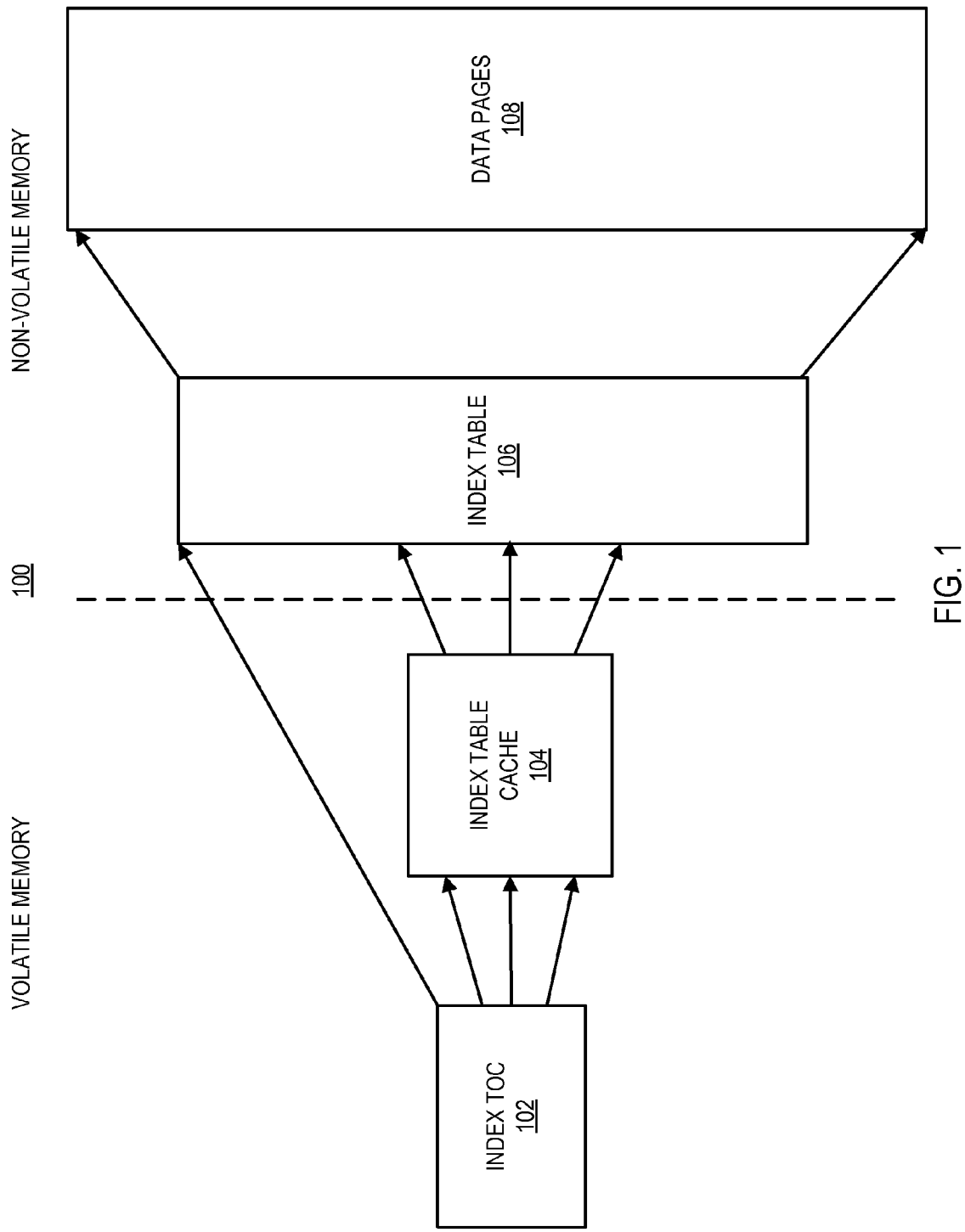
FIG. 1 is a block diagram illustrating an example memory mapping architecture for mapping logical sectors directly into physical pages using an index table and index table of contents (TOC).

FIG. 1 is a block diagram illustrating an example memory mapping architecture 100 for mapping logical sectors into physical pages using lookup tables. In some implementations, a lookup table 102 in volatile memory (e.g., RAM) holds the location (e.g., physical address) of a lookup table 106 in non-volatile memory (e.g., flash memory). The lookup table 106 holds the physical addresses of data pages 108. In some implementations, a cache 104 in volatile memory holds the physical addresses of recently written logical sectors to allow faster readout. In the example shown, the lookup table 102 is also referred to as a index TOC 102, the lookup table 106 is also referred to as the index table 106 or index page, and the cache 104 is also referred to as the index table cache 104.

In the architecture 100, the index TOC 102 enables the index table 106 to be stored in the non-volatile memory. This is advantageous since the small amount of RAM that is typically available in controllers cannot be scaled due to a rise in cost, area and power consumption of the controller. In some implementations, the volatile memory can be dynamically configured based on its availability or other trigger events and/or operational modes.

Example Data Structures in Volatile Memory

In some implementations, a data block can be associated with a block table stored in volatile memory that can include: a block status data (e.g., free, bad, allocated, current), a valid pages number, an erase count and an error correction code (ECC) fix count.

In some implementations, each entry of the index TOC 102 stores a physical address in non-volatile memory of an index table 106 entry and a pointer to an entry in the index table cache 104. The address 0xff or other suitable indicator can be placed in a index TOC 102 entry to indicate that a desired index table 106 entry is not stored in the index table cache 104.

In some implementations, the following structures need to be allocated in volatile memory (e.g., RAM): a number of free entries in the index table cache, a current data block (e.g., a block that is being used for write or update operations), a pointer to a next free page in the current block, a current block TOC (e.g., a TOC stored in a block that includes information for mapping logical sectors to pages in the block), a current index block (e.g., a block that is being used for index updates), a pointer to a next free page in the index block, a current index block TOC and a number of free blocks.

In some implementations, each entry of the index table cache 104 can include but is not limited to: a buffer to hold data (e.g., a 2K buffer), status data (e.g., clean, dirty, free), a counter (e.g., a serial counter or count indicating how many times that particular block has been accessed).

The data structures described above are examples and other data structures can be used based on the application. The data structures, such as the Block TOC, are described in more detail in reference to the other figures.

Example Read Operation

Figure 2A:
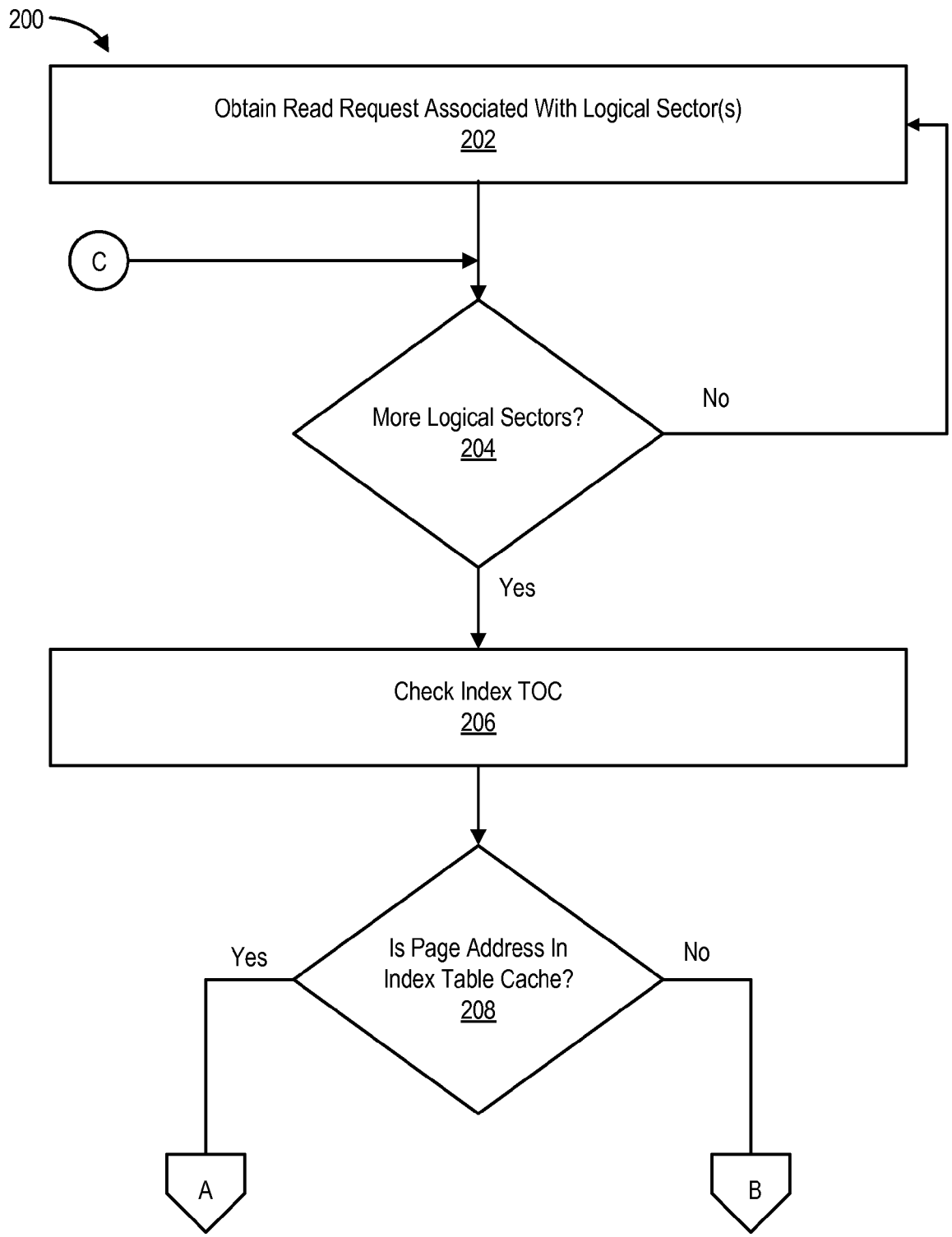
FIGS. 2A-2B are flow diagrams of an example read operation using the memory mapping architecture shown in FIG. 1.
Figure 2B:
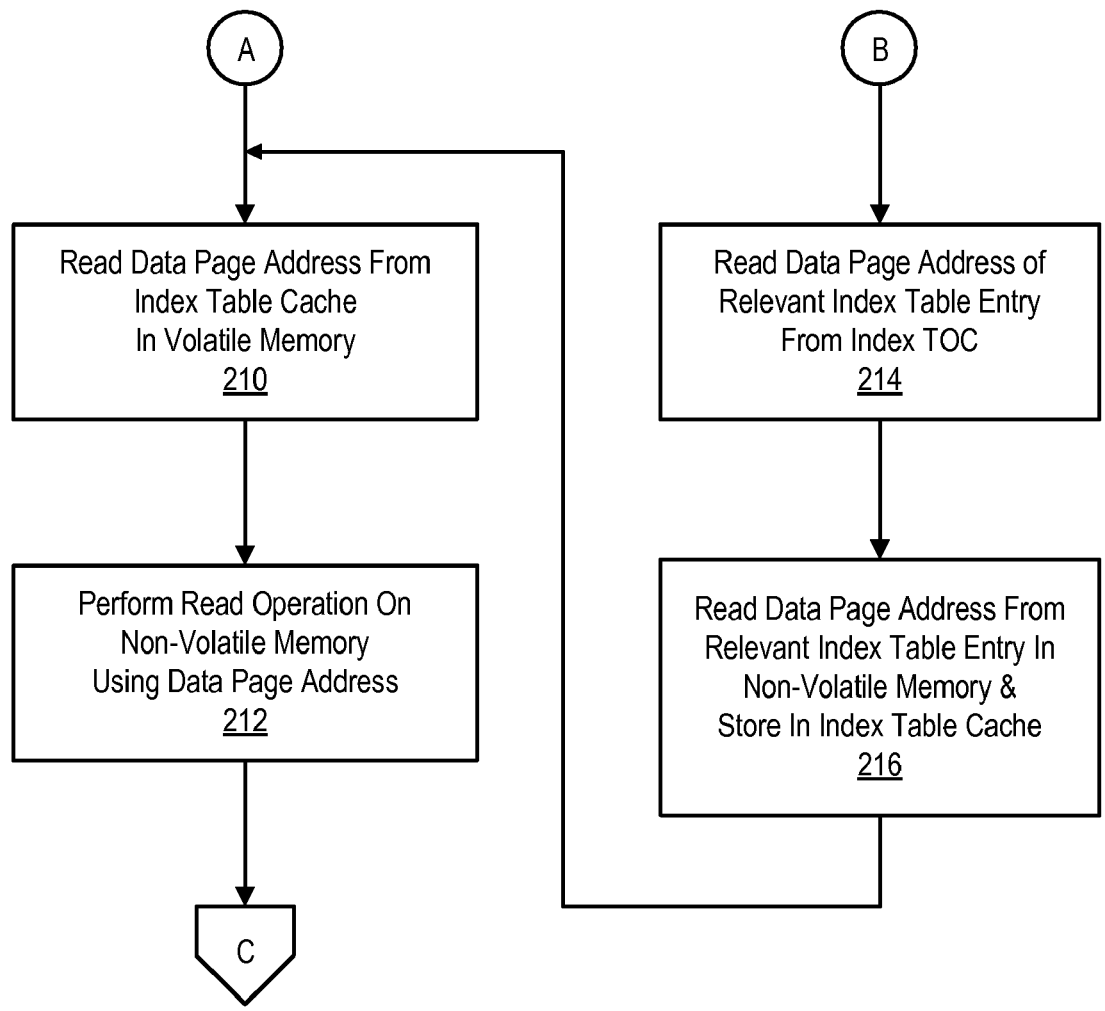

FIGS. 2A-2B are flow diagrams of an example read operation 200 using the memory mapping architecture shown in FIG. 1.

Referring to FIG. 2A, in some implementations, the read operation 200 can begin by obtaining a read request associated with one or more logical sectors (202). For example, the read request can be issued by a file system. The read request can include a first sector number and a number of consecutive sectors. For each logical sector in the request (204), an index TOC (e.g., index TOC 102) in volatile memory is checked (206) to determine if a data page address associated with the current logical sector is stored in an index table cache in volatile memory (e.g., index table cache 104). If the data page address is stored in the index table cache (208), then the data page address is read from the index table cache (210) and used to perform the read operation on non-volatile memory (212).

If the data page address is not stored in the index table cache (208), then the physical page address of the relevant index table entry storing the data page address is read from the index TOC (214), and the relevant index table entry storing the data page address is read from the index table entry and stored in the index table cache (216). The data page address can then be read from the index table cache (210) and used to perform the read operation on non-volatile memory (212).

If more logical sectors need to be processed (204), then the foregoing steps are repeated until all logical sectors are processed for the read operation 200.

In some implementations, if during step 216 the index table cache is full, older data page addresses in the index table cache can be flushed to make room for newer data page addresses read from the index table in non-volatile memory.

The flushing of the index table cache can trigger unnecessary write operations on non-volatile memory. To avoid unnecessary write operations, an overflow buffer can be created in volatile memory and used to store the data page address read from the index table in non-volatile memory. The overflow buffer can be read to get the data page address for use in the read operation 200. Thus creating an overflow buffer in volatile memory can prevent unnecessary write operations to non-volatile memory during read operations.

Referring to FIG. 1, the index TOC 102 in volatile memory contains information about the index table 106 that holds the physical page address of the data page 108 to be read. The index table 106 can be stored in the index table cache 104 in volatile memory or stored in an index block in non-volatile memory. If the index table 106 is stored in the index table cache 104, the index table 106 can be read from the index table cache 104 and used to find the physical address of the data page 108 to be read in non-volatile memory. If the index table 106 is not stored in the index table cache 104, then the data page address can be read from the relevant entry of the index table 106 in non-volatile memory to the index table cache 104. The data page address can be read from the index table cache 104 and used to perform the read operation on the data page 108 in non-volatile memory.

In some implementations, the read operation 200 gets a logical sector number (Lpn) and a number of consecutive logical sectors to read. The read operation 200 maps the logical sector number into physical locations in the non-volatile memory. Assuming a page size of 2 KB, some example steps for the read operation 200 can be described using pseudo code as follows:

Step 1: indexPage=readPhysicalPage (TOC[Lpn/512])
Step 2: dataBuffer=readPhysicalPage (indexPage[Lpn % 512])
Step 3: return dataBuffer, where readPhysicalPage is a function that returns a pointer to a physical page, TOC[ ] and indexPage[ ] are arrays for storing TOC entries and indexPage entries, respectively, and 512 is the number of data pages that are mapped by an index table entry (512*4 bytes=2 KB). In this example, the type indexPage holds the starting address (pointer) of the index table and the type dataBuffer holds the starting address (pointer) of the data pages that correspond to the logical sector number Lpn to be read.

Example Write Operation

Figure 3A:
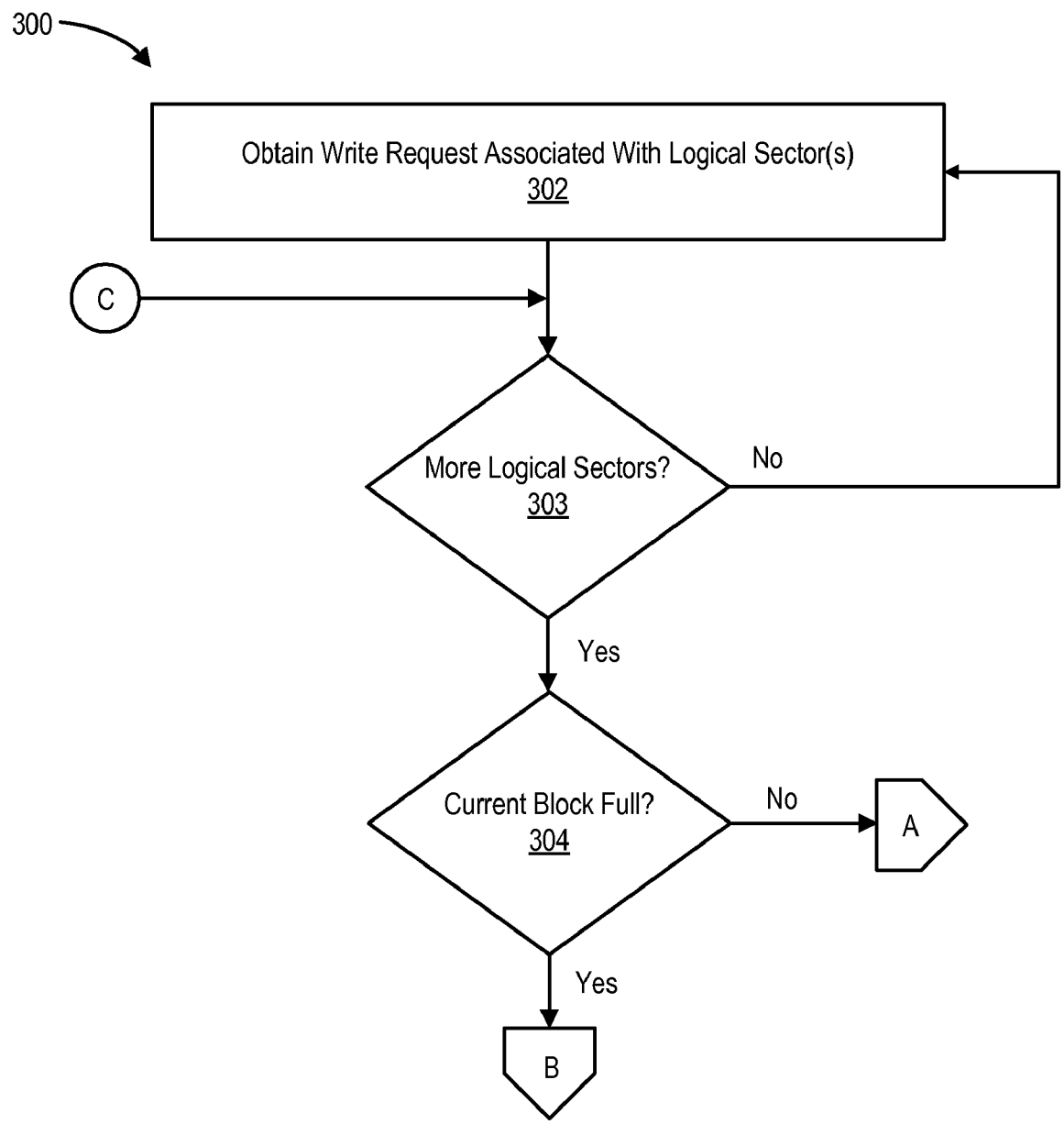
FIGS. 3A-3C are flow diagrams of an example write operation using the memory mapping architecture of FIG. 1.
Figure 3B:
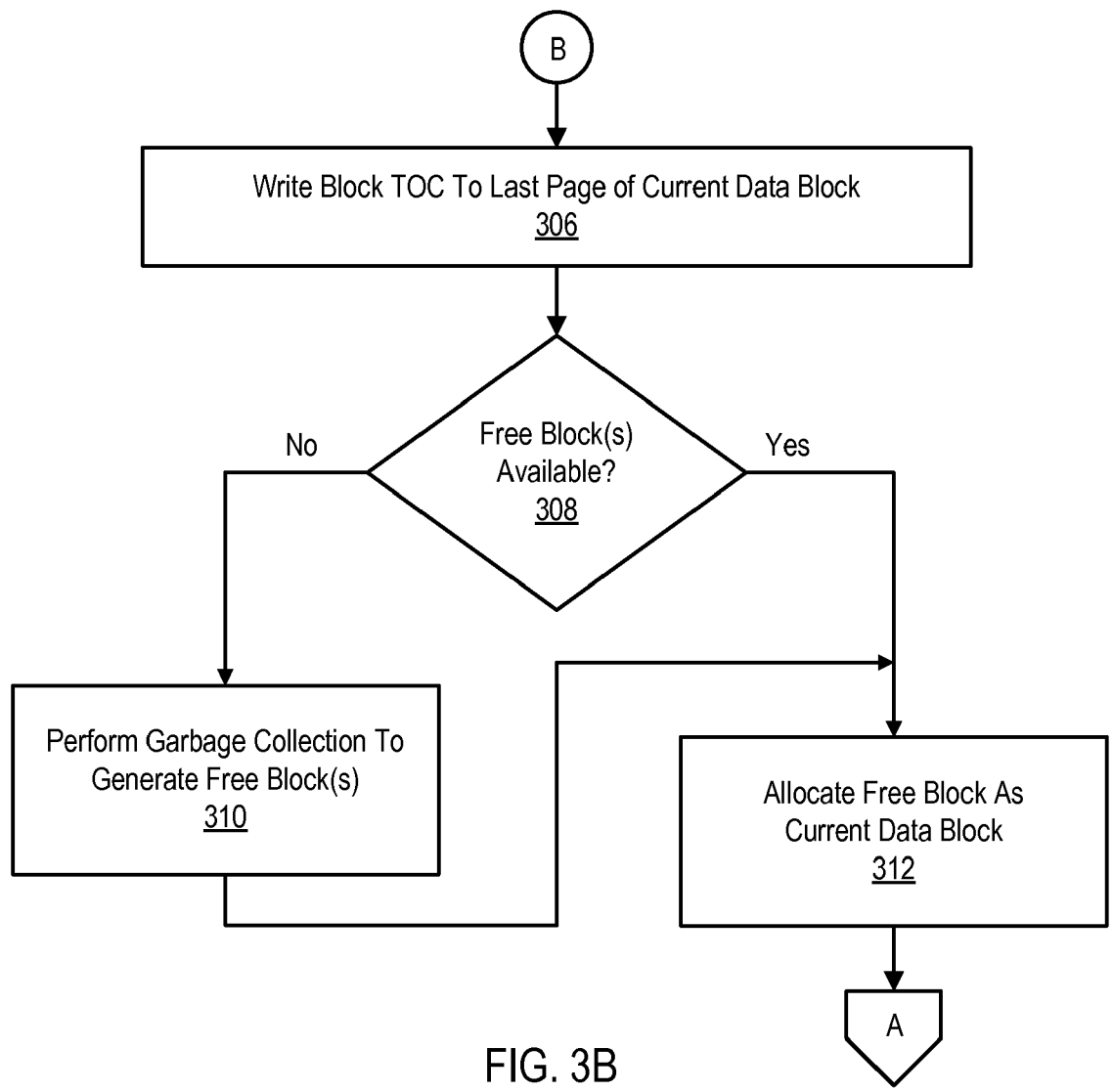
Figure 3C:
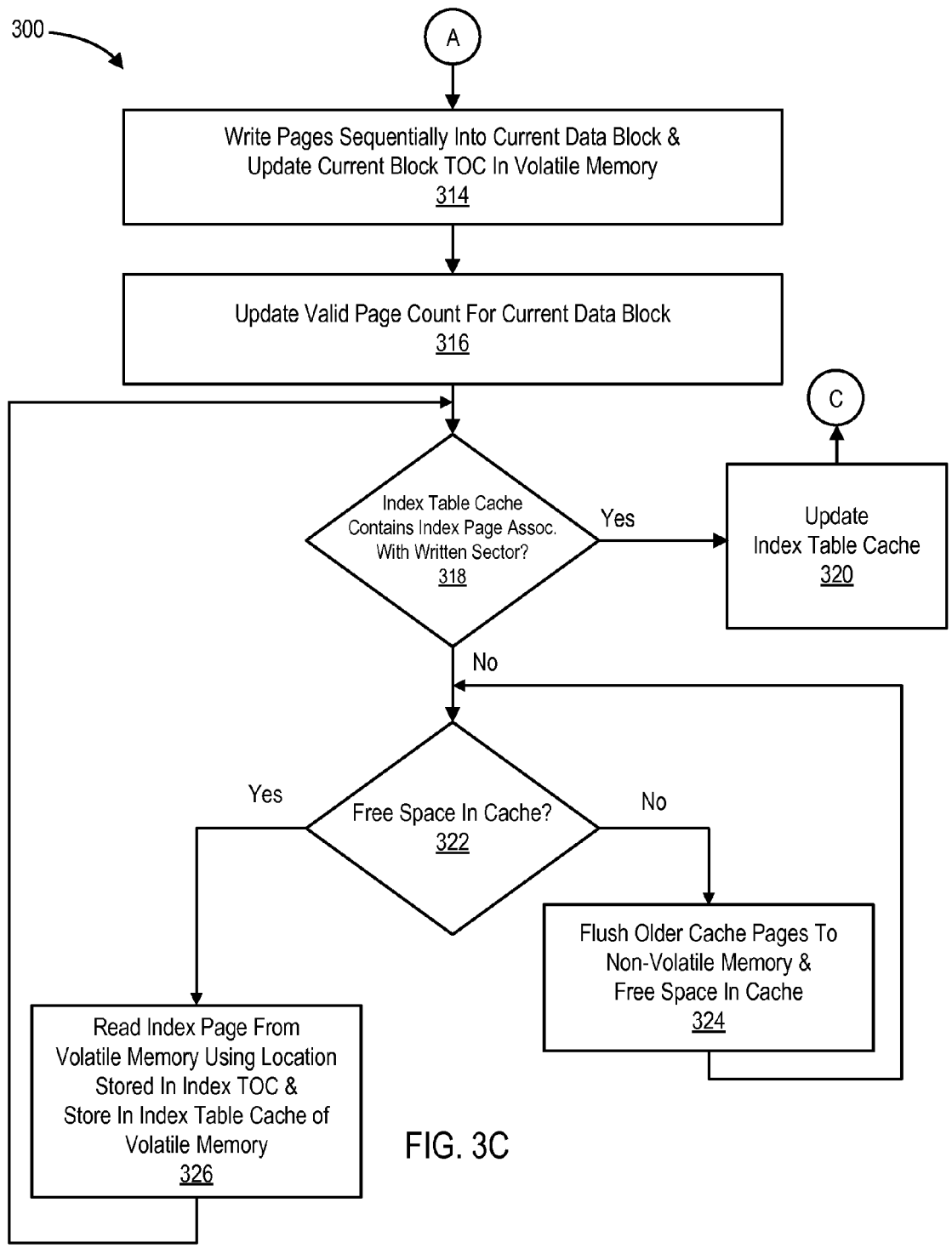

FIGS. 3A-3C are flow diagrams of an example write operation 300 using the architecture shown in FIG. 1.

Referring to FIGS. 3A and 3B, in some implementations the write operation 300 can begin by obtaining a write request associated with one or more logical sectors (302). For example, the write request can be issued by a file system. The write requests can include a first logical sector address and a number of consecutive logical sectors to write. For each logical sector in the request (303), if a current data block is full (304), then write a block TOC to a page (e.g., the last page) of the current data block (306), as described in reference to FIG. 6.

The current data block can be an active block used for updates. The block TOC can be a page in non-volatile memory (e.g., last page in block) that describes all the pages in the block. The block TOC can be used in restore operations to reconstruct a temporary index table in volatile memory (e.g., RAM) without scanning (reading) the whole block, as described in reference to FIGS. 4A-4B. The block TOC can also be used in GC operations, as described in reference to FIG. 7.

Referring to FIG. 3B, if free blocks are available (308), then the available free blocks can be allocated as new current data blocks (312). If no free blocks are available (308) (e.g., the number of free blocks is below a threshold value), then a GC operation can be performed to generate free blocks (310) until the threshold number of free blocks is met. A free block can then be allocated as the current data block (312). If the current data block is not full (304), then the write operation 300 continues to step 314, as show in FIG. 3C.

In some implementations, the block TOC for the current data block can be stored in volatile memory until the current data block is full and a new current data block is allocated. At that time, the block TOC for the old current data block can be written to non-volatile memory (e.g., the last page of the current data block) and a block TOC for the new current data block can be reset in volatile memory.

Referring to FIG. 3C, the write operation continues by writing pages sequentially into the current data block and updating the current block TOC (314) in volatile memory (318). A valid page count for the current data block is updated (e.g., incremented or decremented by an appropriate number). If the index table cache contains an index page associated with a written sector, it is updated (320). In some implementations, the valid page count can be stored in a block table 513 (FIG. 5).

If the index table entry associated with the written sector is not in the index table cache (318), and there is free space available in the index table cache (322), then the index page is read from non-volatile memory using the location stored in the index TOC and stored in the index table cache in volatile memory (326). If there is no free space in the cache (322), then older cache pages can be flushed to non-volatile memory (324) to free up space in the cache to store newer pages read from non-volatile memory. After space is freed in the index table cache, the condition at step (322) is met, and the index page is read from non-volatile memory using the location stored in the index TOC and stored in the index table cache in volatile memory (326).

In some implementations, the write operation 300 gets a logical sector number (Lpn) and a number of consecutive logical sectors to write. The write operation 300 then stores all the pages sequentially into a current data block in non-volatile memory used for updating. A new current data block can be allocated for updating if the current data block is filled up. If a new current data block needs to be allocated and there is not enough free blocks, a GC operation can be performed to free blocks. The write operation 300 can be described using pseudo code as follows:

Step 1: allocate new block (optional).
Step 2: if new blocks are needed and there are not enough free blocks, then perform GC operation to generate free blocks (optional).
Step 3: write dataBuffer that represents Lpn into a current data block (Cvbn) and store the physical page number (Vpn) in memory.
Step 4: Check if index page associated with Lpn is in index cache. If it is go to Step 6.
Step 5: Check if index cache is full. If it is not go to Step 7.
Step 6: Write one of the index pages from cache to flash and update an entry associated with it in index TOC.
Step 7: Read index page associated with Lpn into index cache: indexPage=readPhysicalPage (TOC[Lpn/512]).
Step 8: Update entry in index page associated with Lpn: indexPage[Lpn % 512]=Vpn.

Note that the Steps 1 and 2 are optional. Step 1 would depend on the current data block state (e.g., how full the current block is) and Step 2 would depend on how many free blocks are available.

To avoid executing extra read/write operations, some of the index table pages can be stored in volatile memory (e.g., RAM in controller). These pages can be defined as cached index table pages. Cache size can be dynamically configurable and can depend on system RAM availability and/or operation modes, for example. An example operational mode can be, for example, an iPod® "sync mode" where songs are being synced with a song library on a host computer. In "sync" mode, for example, buffers may be freed up and used for read/write memory operations.

Example Garbage Collection Using Block TOCs

A GC operation can be used to free blocks that are occupied by data that is no longer valid for upcoming updates once the media is fully used. The "best candidate" block can be a block with the least amount of valid pages. There can be several triggers for starting a GC operation, including but not limited to: when the number of free blocks falls below a defined limit, in response to read/write disturb degradation (refresh old block that has not been erased for a long time), a new bad block is discovered, etc.

The GC operation can benefit from the page metadata read from the block TOC. GC operations are typically slow and require that each page meta data is read out (effectively means read a whole page) to establish whether it is actually one of the valid pages in a block. A relevant part of page metadata is provided by the block TOC which allows the controller to effectively manage the GC operation without executing unnecessary memory accesses.

Figure 6:
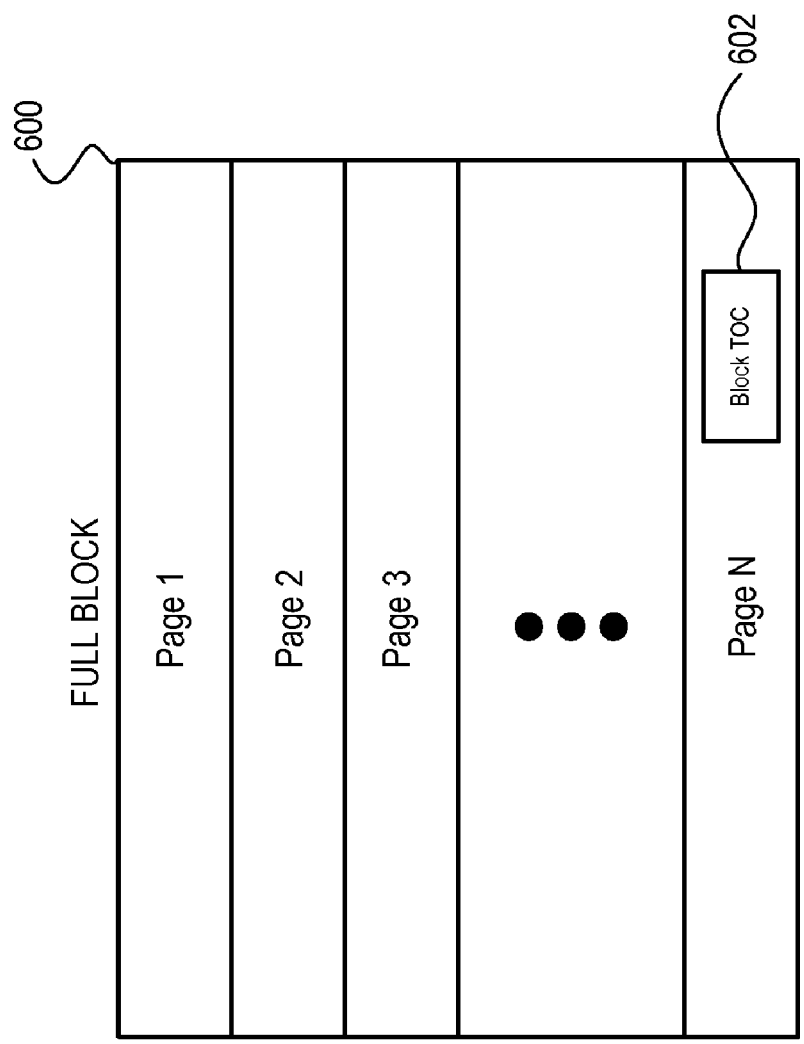
FIG. 6 is illustrates a example current data block with a block table of contents.

In some implementations, a block TOC for a current index block is created and populated in volatile memory. Each block TOC entry can correspond to a page in the current data block. As each page in the current data block is written, the corresponding entry in the block TOC is updated with a corresponding logical sector number corresponding to the page. When the current data block is full, the block TOC is written to the last page of the current data block. For example, as shown in FIG. 6, a block TOC 604 can be written to the last page (e.g., page N) of a full block 602. After the block TOC 604 is written to the last page, a new block can be allocated as the current data block.

If new blocks are not available, then a GC operation can be run to free a full block. The "best candidate block" for GC operations is a full block with the least amount of valid pages, since invalid pages are not copied to a new block before the block can be erased. Accordingly, to determine the "best candidate blocks" for a GC operation, the memory system determines a count of valid pages in each full block. To determine if a given page is valid, the page can be read from the block and cross-referenced with a corresponding entry in the index table 106 in non-volatile memory. This cross-reference operation, however, may trigger undesirable write operations to transfer index pages from the index table 106 in non-volatile memory into cache in volatile memory. To mitigate unnecessary write operations, the memory system can read the logical sector numbers corresponding to the pages from entries of the block TOC to determine if the pages are valid. In some implementations, the block TOC entries are sorted (e.g., sorted in ascending order to cluster like logical sector numbers) to simplify the cross-reference of the logical sector numbers with index table pages. Pages that correspond to the same logical sector numbers are invalid and can be erased without reading the entire page. In some implementations, the valid page count can be stored in a block table 513 in volatile memory (FIGS. 5A and 5B), as shown in FIG. 6.

Example Garbage Collection Operation

Figure 7:
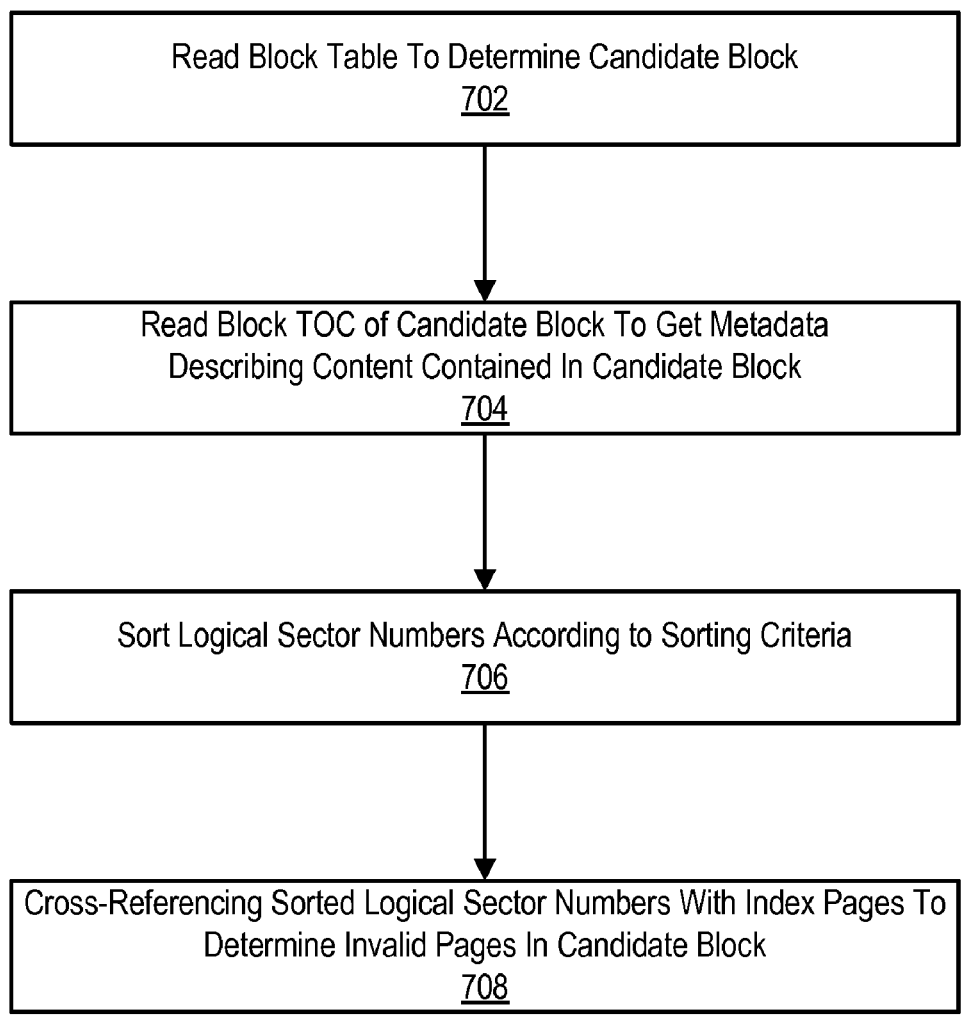
FIG. 7 is a flow diagram of example GC operation using the block table of contents of FIG. 6.

FIG. 7 is a flow diagram of example GC operation 700 using the block TOC of FIG. 6. In some implementations, the GC operation 700 can include reading a block table to determine a candidate block (702), reading the block TOC of the candidate block to get metadata describing the content of the block (704). In this example, the information includes logical sector numbers associated with pages of the block.

In some implementations, the logical sector numbers are sorted (706) according to a sorting criteria (e.g., sorted in ascending order). The sorting results in like logical sector numbers clustering which facilitates the next step of cross-referencing the sorted logical sector numbers with index pages to determine invalid pages in the candidate block (708). The invalid pages in the candidate block are not copied to a new block before the current block is erased. Each valid page is read from non-volatile memory to volatile memory. A write sector process is executed to write the page into the current block, for example, using the process for writing a new page as described in reference to FIGS. 3A-3C.

Example Restore Operations Using Block TOCs

Figure 4A:
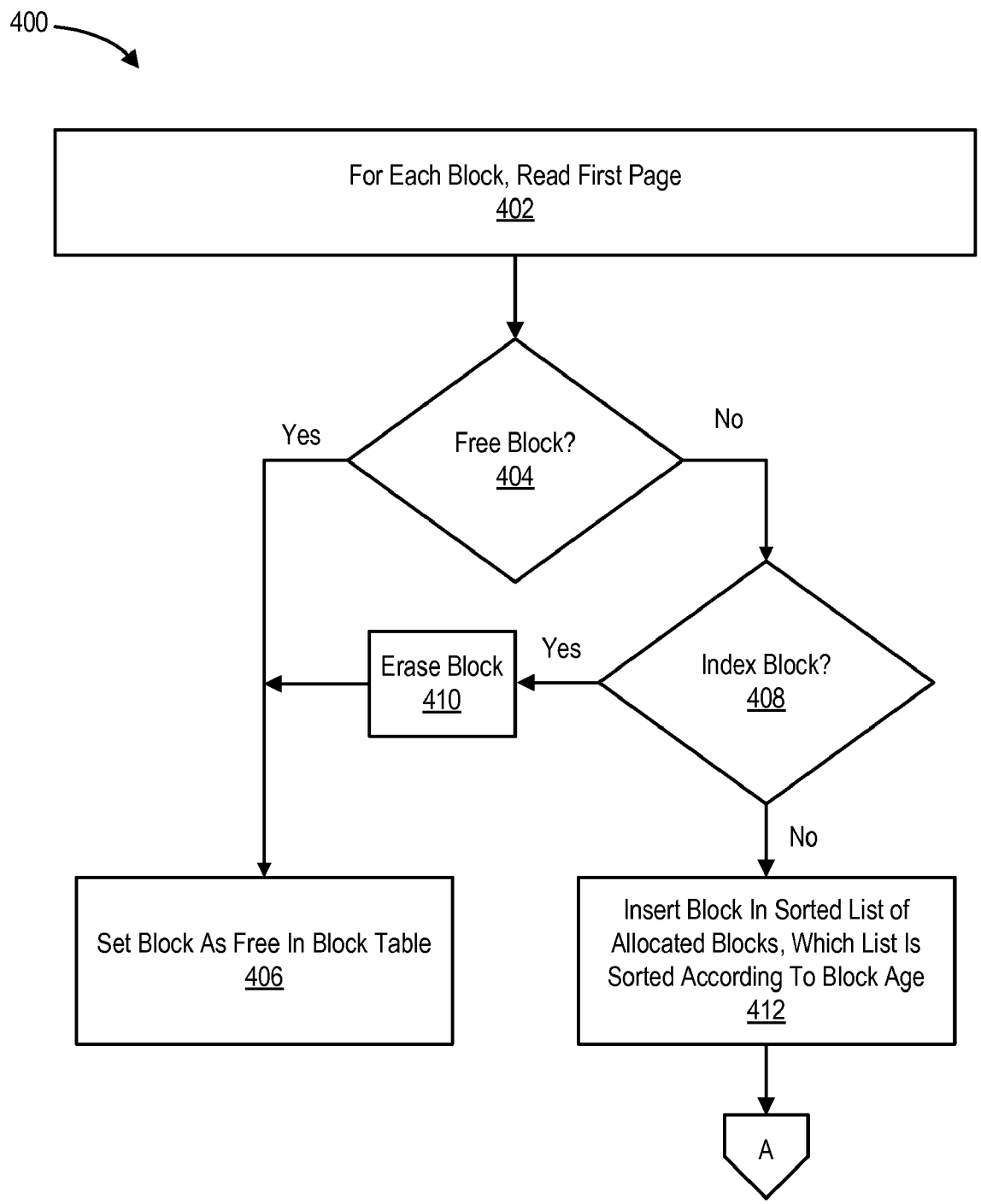
FIGS. 4A-4B are flow diagrams of an example restore operation using the memory mapping architecture of FIG. 1.
Figure 4B:
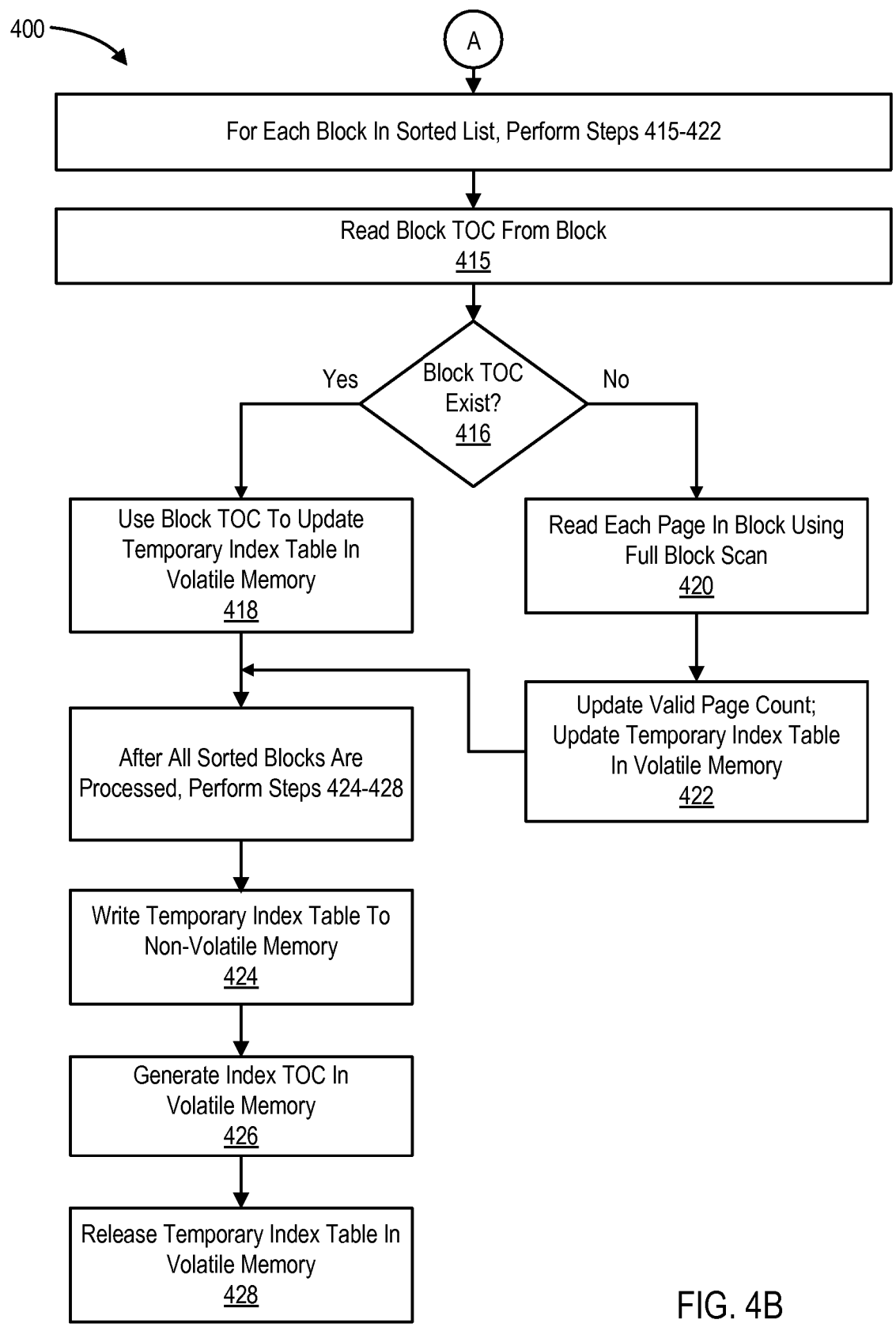

FIGS. 4A-4B are flow diagrams of an example restore operation 400 using the architecture of FIG. 1. The restore operation 400 can be used to recreate the index table 106 and index TOC 102 which can be lost due to a catastrophic event (e.g., a power failure). In some implementations, the restore operation 400 begins by reading a first page for each block (402). If the block is free (404), the block is set as a free block in the index table (406). If the block is not free (404) and the block is an index block (408), then the index block can be erased (410) and set as a free block in the block table (406). If the block is neither free nor an index block (408), the block can be inserted in a list of allocated blocks that are sorted according to their age (412).

Referring to FIG. 4B, for each block in the sorted list, steps 415-422 can be performed as follows. The block TOC is read from the block (415). If the block TOC exists (416), the block TOC can be used to update a temporary index table in volatile memory (418). If the block TOC does not exist (416), then each page in the block can be read using a full block scan (420), the valid page count and the temporary index table are updated (422). After the sorted blocks are processed by steps 415-422, the temporary index table can be written to non-volatile memory (424), the index TOC can be generated in volatile memory (426) and the temporary index table can be released in volatile memory (428).

In some implementations, the list is sorted in increasing order based on a block's age, such that the "youngest" or most recently allocated data is at the top of the sorted list. This ensures that the freshest copy of each logical sector is available while moving from "youngest" to "oldest" in the sorted order.

In some implementations, it is possible to restore an index table in portions to enable the restore operation 400 to work with a smaller memory footprint. This could occur, for example, if the volatile memory was not large enough to accommodate a temporary index table. In this case, the restore operation 400 can allocate a buffer that covers a portion of an index table. Each iteration of the restore operation remaps a data range that can be covered by the allocated index buffer. The number of iterations can be proportional to the size of the index buffer size. For example, a bigger index buffer would require less iterations since each iteration would cover a bigger data range.

Example Memory Subsystems

Figure 5A:
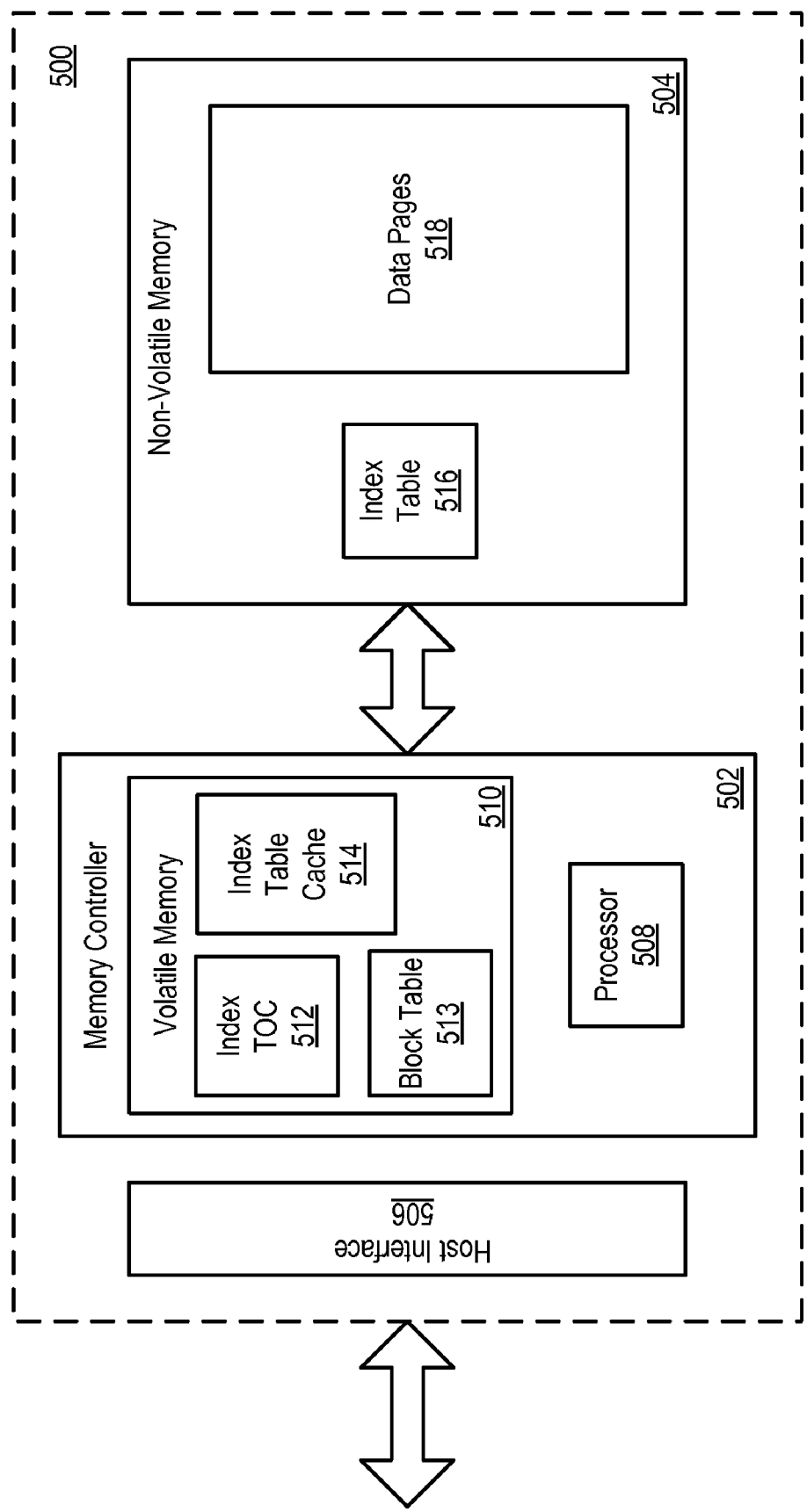
FIG. 5A is a block diagram of example memory subsystem for implementing the memory architecture and operations of FIGS. 1-4 and 7.

FIG. 5A is a block diagram of example memory subsystem for implementing the memory architecture and operations of FIGS. 1-4 and 7. In some implementation, the subsystem 500 can include a controller 502, non-volatile memory 504 and host interface 506. The controller 502 can include volatile memory 510 (e.g., RAM) and processor 508. The volatile memory 510 stores a block TOC 512, a block table 513 and an index table cache 514. The volatile memory 510 can be configured dynamically by the processor 508 based on availability and any other suitable factors. The non-volatile memory 504 can include an index table 516 and data pages 518. The subsystem 500 can include other components that have been omitted from FIG. 5 for clarity.

In operation, the host interface 506 can obtain read/write requests from a host system over a bus (e.g., IDE/ATT). The host interface 506 can include circuitry and software for receiving data, addresses and control signals. The read/write requests can include a logical sector number and a number of consecutive logical sectors to read/write.

The processor 508 can access the volatile memory 510 and read the index TOC 512 to determine if the index table cache 514 includes physical addresses for the logical sector. If the index table cache 514 includes the physical addresses, then the physical addresses are used for the read/writ operation. If the index table cache 514 does not include the physical addresses, then the processor 508 accesses volatile memory 510 to read the index TOC 512 to get the page address of the index table 516 in the non-volatile memory 504. The processor 508 can use the physical addresses in the index table 516 to perform a memory mapping to data pages 518 during the read/write operation. The block table 513 can store the valid page counts for blocks which can be used to determine "best candidate blocks," as described in reference to FIG. 7.

In some implementations, the data pages 518, index TOC 512 and/or index table 516 can be implemented on one or more different memory devices.

Figure 5B:
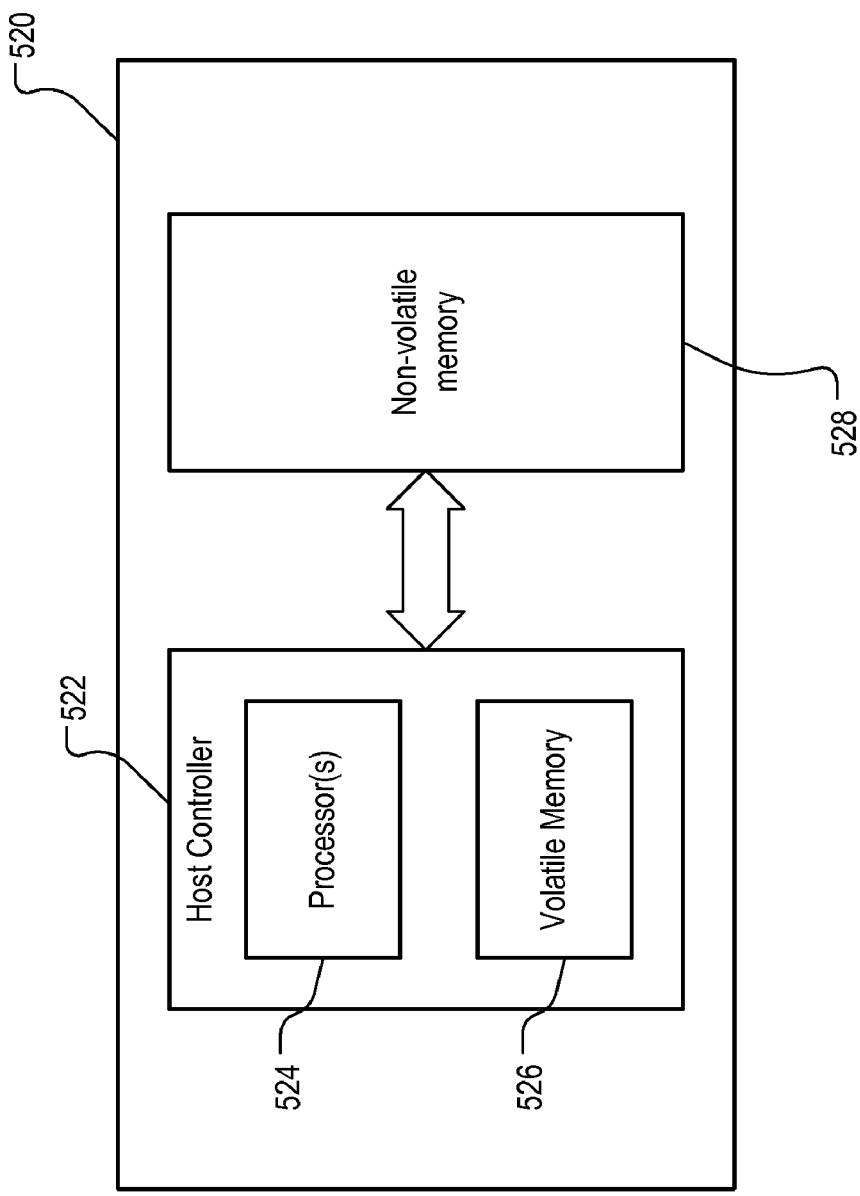
FIG. 5B is a block diagram illustrating the system architecture of an example device including a memory subsystem for implementing the memory architecture and operations of FIGS. 1-4 and 7.

FIG. 5B is a block diagram illustrating an example device 520 including a memory subsystem for implementing the memory architecture and operations of FIGS. 1-4 and 7. In some implementations, the device 520 is a portable device, such as a media player device, a personal digital assistant, a mobile phone, portable computers, digital cameras, and so on, for example.

The device 520 includes a host controller (or a so-called "System-on-Chip" or "SoC") 522 and non-volatile memory 528. The device 520 can optionally include additional memory external to the host controller 522 and the non-volatile memory 528. The host controller 522 includes one or more processors 524 and volatile memory 526. In some implementations, volatile memory 526 is static random-access memory (SRAM). The host controller 522 performs various processing operations and input/output operations, including the operations described in reference to FIGS. 2-4. For example, the host controller 522 can receive and process user inputs, generate outputs, perform media (e.g., audio, video, graphics) decoding and processing operations, other processing operations, and so on. The host controller 522 can read data from and write data to volatile memory 526. The host controller 522 can also issue read or write operations to the non-volatile memory 528 through an interface (not shown).

In some implementations, the non-volatile memory 528 is NAND flash memory. In some other implementations, the non-volatile memory 528 is another type of non-volatile memory, such as NOR flash memory, other types of solid state memory, or a hard disk drive, for example. The device 520 can also include one or more other components that have been omitted from FIG. 5B for clarity.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
identifying blocks of non-volatile memory that are not free;
reconstructing at least a portion of an index table by performing the following for each of the identified blocks:
determining if a block table of contents (TOC) exists in a page of the identified block of non-volatile memory, wherein the block TOC includes information mapping logical sectors to pages in the identified block;
if the block TOC does not exist,
reading the entire block to identify logical sectors that correspond to the pages of the identified block;
updating the index table in volatile memory using information obtained from reading the entire block, the index table for storing page addresses for mapping logical sectors of a read or write request to pages of the identified block;
if the block TOC exists,
updating the index table using the information contained in the block TOC that maps logical sectors to the pages in the identified block;
after reconstructing the at least a portion of the index table:
writing the index table to non-volatile memory; and
generating an index TOC in volatile memory from the index table.

2. The method of claim 1, further comprising:
releasing the index table in volatile memory.

3. The method of claim 1, where the block TOC is stored in a last page of the identified block of non-volatile memory.

4. The method of claim 1, further comprising:
updating a valid page count for the identified block in volatile memory, where the valid page count is used to determine a best candidate block for garbage collection (GC) operations.

5. The method of claim 1, where identifying the blocks comprises generating a sorted list of the blocks that are not free, wherein each of the identified blocks are examined according to an order of the sorted list.

6. The method of claim 5, where the sorted list of blocks is sorted in increasing order based on block age.

7. A system comprising:
non-volatile memory;
a controller coupled to identify blocks of the non-volatile memory that are not free, and operable to reconstruct at least a portion of an index table by performing the following for each of the identified blocks:
determining if a block table of contents (TOC) exists in a page of the identified block of non-volatile memory, wherein the block TOC includes information mapping logical sectors to pages in the identified block;
if the block TOC does not exist,
reading the entire block to identify logical sectors that correspond to the pages of the identified block;
updating the index table in volatile memory using information obtained from reading the entire block, the index table for storing page addresses for mapping logical sectors of a read or write request to pages of the identified block;
if the block TOC exists,
updating the index table using the information contained in the block TOC that maps logical sectors to the pages in the identified block;
wherein the controller is further configured to perform the following after reconstructing the at least a portion of the index table:
writing the index table to non-volatile memory; and
generating an index TOC in volatile memory from the index table.

8. The system of claim 7, further comprising:
releasing the index table in volatile memory.

9. The system of claim 7, where the block TOC is stored in a last page of the identified block of non-volatile memory.

10. The system of claim 7, further comprising:
updating a valid page count for the identified block in volatile memory, where the valid page count is used to determine a best candidate block for garbage collection (GC) operations.

11. The system of claim 7, where identifying the blocks comprises generating a sorted list of the blocks that are not free, wherein each of the identified blocks are examined according to an order of the sorted list.

12. The system of claim 11, where the sorted list of blocks is sorted in increasing order based on block age.

* * * * *